April 7, 1959     W. KADEN ET AL     2,880,661
CAMERA SHUTTER SPEED SETTING AND FILM RE-WINDING DEVICE
Filed Oct. 20, 1954
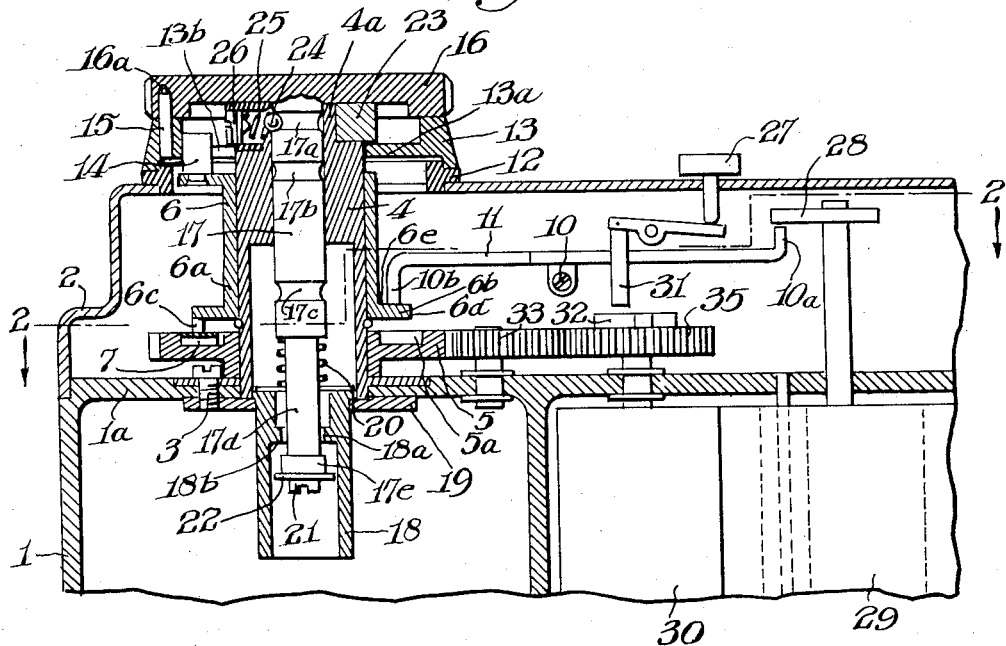
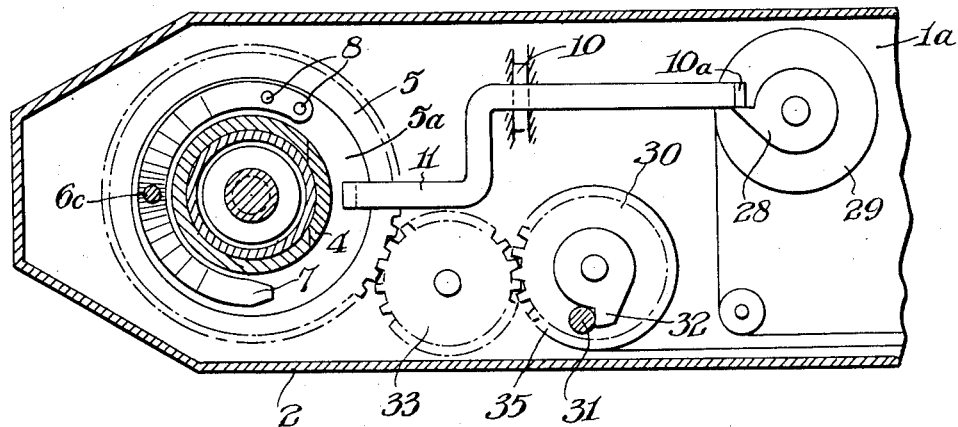
INVENTORS
Willy Kaden
Franz Pejschl
BY Connolly and Hutz
ATTORNEYS

United States Patent Office 2,880,661
Patented Apr. 7, 1959

2,880,661

CAMERA SHUTTER SPEED SETTING AND FILM RE-WINDING DEVICE

Willy Kaden and Franz Peischl, Munich, Germany, assignors to AGFA Aktiengesellschaft Application October 20, 1954, Serial No. 463,465

Claims priority, application Germany October 24, 1953

8 Claims. (Cl. 95—31)

The present invention relates to a combined shutter speed setting and film re-winding device for focal plane shutter photographic cameras.

The manufacture of focal plane shutter cameras requires a relatively considerable number of mechanical and optical elements. The construction of such a camera is in most cases complicated and the large number of components take up much space and are frequently mechanically delicate and subject to damage under normal conditions of use. In addition, the multiplicity of components used in building such cameras have heretofore prevented the production of a camera of the required convenience and reliability in use.

As will be readily understood by those skilled in the art the instant type camera includes mechanism for actuating a first shutter blind directly with the release of the shutter and a second shutter blind after a predetermined delay period. Usually the camera includes a shutter setting knob, a film rewinding mechanism control means to set a time delay for the second shutter, and an interconnection between the control means, setting knob and first shutter.

To overcome the aforenoted and similar disadvantages, the present invention provides a combined shutter speed setting and film re-winding device in which the shutter speed setting knob can be adjusted continuously both before and after the shutter has been released and is stationary during the shutter operation. The arrangement is such that cam cooperating wtih the shutter drum of the first shutter blind, in conjunction with a coupling which is free with respect to the shutter speed setting knob, moves a control sleeve in an axial direction, thereby releasing the second shutter blind directly or indirectly.

According to the present invention the shutter drum of the first shutter blind cooperates with a stud provided on the control sleeve through a gear, having an annular channel to which the cam disc, cam spring or the like is rigidly attached. The end of the stud bearing control sleeve is at the same time advantageously designed as a cam disc, the edge of which actuates a retarding mechanism to obtain long shutter speeds.

Furthermore, it is ensured, by a suitable spatial arrangement, that the second shutter blind is actuated directly by axial displacement of the control sleeve, or indirectly through an intermediate member such as a lever, or the like.

A particular feature of the invention is the arrangement whereby the rewind spool can be actuated from the speed setting knob. For this purpose, the setting knob carries spindle and the film spool includes a key which can be coupled with the spindle by pulling out the shutter speed setting knob. The spindle carries annular grooves cooperating with a detent mechanism for providing a position index. The process of coupling the key with the spindle at the same time disconnects a pin-coupling between the shutter speed ring and the shutter speed setting knob. By pulling the shutter speed setting knob out up to a lower annular groove of the spindle, the key is completely withdrawn from the film cartridge chamber so that either a new film cartridge can be inserted, or the exposed cartridge can be removed, with ease and without any obstruction.

The advantages of the arrangement described above are self-evident: The combination of shutter speed setting and film re-winding device provides for the user of the camera great convenience and reliability in handling the camera. This is mainly achieved by the simple and efficient design which requires only a few components that are simple and inexpensive to manufacture.

The invention is illustrated in the accompanying drawing, in which Fig. 1 is a vertical section through a shutter speed setting and film re-winding device in the normal position of use of the camera, and Fig. 2 is a horizontal section on the line A—B in Fig. 1.

Referring to the drawing, the top 1a of the camera housing 1 is covered by a cap 2. A screw 3 connects a guide bush 4 with the camera housing 1. Said guide bush carries a rotatable gear 5 and a sleeve 6. An arcuate spiral cam surface 7 is rigidly attached with rivets, screws or the like, 8, in an annular channel 5a in the upper face of the gear 5. The lower end 6a of the sleeve 6 is shaped as a cam disc 6b, on the underside of which a stud 6c is provided. The edge 6d of the cam disc 6b actuates by means of a lever 9 a retarding mechanism (not shown in the drawing) for the long shutter speeds. The release of the second shutter blind is effected by the cooperation of the top face 6e of the cam disc 6b with an angle lever 11 adapted to pivot about a fulcrum 10.

Lever 11 includes a downwardly bent end 10b which rests against the upper surface 6e of the cam disc 6b. The opposite end of lever 11 is bent upwardly at end 10a which is disposed in the path of movement of the releasing element 28 of the second shutter blind roller 29. Lever 11 is shown in the position which it assumes at the moment that it releases the second shutter blind. This release is accomplished when the downwardly bent end 10b of lever 11 is raised by upward movement of the cam disc 6b. This rotates lever 11 about the pivot 10 and lowers end 10a out of the path of movement of element 28. The second shutter blind is released in this manner after the releasing element 27 is pressed which moves pin 31 upward to release the latching element 32 connected to the first shutter blind roller 30. Release of the first shutter blind causes an upward movement of cam surface 6b as is later described in detail.

A tapered ring 13 is provided with a shutter speed dial and is fitted on an intermediate ring 12 rigidly let into the cap 2. An internal web flange 13a of the ring 13 has a radial slot 13b through which slot protrudes a pin 14. This pin is rigidly connected to the sleeve 6 by riveting or the like, and turns the sleeve 6, etc., when the shutter speed is being set. Near the periphery of the shutter speed dial ring 13 there is attached a pin 15 which is adapted to engage in a corresponding bore 16a in a shutter speed setting knob 16 and thereby couples the shutter speed dial 13 with the shutter speed setting knob 16.

The shutter speed setting knob 16 is rigidly connected with a spindle 17 which has three annular grooves 17a, 17b, 17c, of equal depth. The lower end 17d of the spindle 17 is of reduced diameter compared wtih the remainder of the spindle, and this reduced portion projects into the spool key 18 which latter is held in the guide bush 4 by means of a disc 19. By means of a compression spring 20 the key 18, when in the normal position (see Fig. 1), is held in permanent engagement with the core of the film spool (not shown in the drawing).

The key 18 is coupled with the spindle 17 by pulling out the shutter speed setting knob 16, the squared end 17e of the spindle 17 entering a corresponding recess 18a in the key 18 until a stop disc 22, secured by a screw 21, registers against the face 18b of the key 18.

The pulling out of the shutter speed setting knob 16 at the same time causes the pin 15 on the shutter speed dial ring 13 to release the shutter speed setting knob 16 for angular movement independently of the ring 13.

The upper end 4a of the guide bush 4 is suitably reduced in diameter to receive a ring 23 which contains a spring-ball detent consisting of a ball 24, spring 25 and screw 26. When the spindle 17 is pulled out, the ball is disengaged from the annular groove 17a of said spindle and may enter in turn grooves 17b and 17c.

The setting of the shutter speed by means of the combined shutter speed setting and film re-winding device is carried out in the following manner, with the device in the position shown in Fig. 1:

The selected shutter speed is set by turning the shutter speed setting knob 16 and the shutter speed dial ring 13 coupled with it. The turning movement is transmitted through the slot 13b of the shutter speed dial ring 13 to the pin 14 attached to the sleeve 6, and the pin 14 now turns the sleeve 6, and with it the cam disc 6d and the stud 6c, through an angle corresponding to the selected shutter speed with respect to the arcuate spiral cam surface 7 provided in the annular channel 5a of the gear 5.

On releasing the camera shutter, the first blind of the shutter moves aside and at the same time the gear 5 (which meshes with gear 33 and gear 35 which is connected to the first shutter blind roller 30) is turned. The stud 6c now runs over the moving spiral cam 7 and moves the sleeve 6, rigidly connected with it, upwards in the axial direction. While owing to the axial movement of the sleeve 6 the upper surface 6e causes the angle lever 11 to pivot outwards about its fulcrum 10 and thereby to release the second shutter blind after an adjusted time interval, the edge 6d of the cam disc 6b controls the retarding mechanism for the long shutter speeds.

There is sufficient axial freedom between the sleeve 6 and the knob 16 to allow of running down of the shutter without disturbing the knob 16.

After the last film frame has been exposed, the shutter speed setting knob 16, together with the spindle 17 attached to it, is pulled out until the ball catch (comprising members 24, 25, 26) engages in the annular groove 17b. The film can now be wound back into the cartridge by engagement of the squared portion 17e in the recess 18a. To enable the cartridge to be taken out of the camera, the shutter speed setting knob 16 is pulled out until the ball catch engages in the annular groove 17c. The pulling out of the shutter speed setting knob 16 withdraws the key 18 up the bush 4, thereby removing it from the film spool chamber so that the film cartridge can now be taken out.

As many apparently widely different embodiments of this invention may be made without departing from the spirit and scope hereof, it is to be understood that the invention is not limited to the specific embodiments hereof, except as defined in the appended claims.

What we claim is:

1. A combined shutter speed setting and film rewinding device for a focal plane shutter photographic camera having a first and a second shutter blind respectively associated with a first and a second shutter drum, said device comprising a guide bushing mounted upon said camera, a control sleeve movably mounted upon said bushing, a film rewinding knob and spindle movable mounted within said bushing, a cam member rotatably mounted upon said bushing, said control sleeve including a cam follower member operatively engaged with said cam member to axially move said control sleeve when said cam member is rotated through a predetermined angle, said cam member including means for coupling said cam member to said first shutter drum, a lever for releasing said second shutter drum, said control sleeve including projecting means operatively associated with said lever to cause said second shutter drum to be released when said cam member is rotated through said predetermined angle, and disengageable means coupling said knob to said control sleeve for rotating said control sleeve to vary the initial angular relationship between said follower and said cam member to determine the interval between the release of said first and second shutter blinds.

2. A device as set forth in claim 1 wherein said disengageable means coupling said knob to said control sleeve is slotted to permit axial movement between said control sleeve and said knob to allow said knob to remain stationary during the release of said shutter blinds.

3. A device as set forth in claim 1 wherein said cam member includes a gear coaxially disposed with respect to said rewinding spindle, said gear providing means for rotatably coupling said cam member to said first shutter drum. and said gear including a cam surface disposed in an annular channel on one of its faces.

4. A device as set forth in claim 1 wherein said control sleeve includes a radially extending cam surface for actuating a retarding mechanism for setting slower shutter speeds.

5. A device as set forth in claim 1 wherein a film rewinding spool is rotatably mounted in said camera coaxially with said film rewinding spindle, said spool and said spindle including key and socket means for disengageably coupling said spindle to said spool when said knob and spindle are moved axially relative to said spool.

6. A device as set forth in claim 5 wherein said disegageable means includes a speed setting indicator member, said knob being axially removable from said speed indicating setting member into engagement with said spool for rewinding film while said speed indicating setting member and control sleeve are stationary.

7. A device as set forth in claim 6 wherein said bushing includes a recess and said spindle and spool include cooperative means for withdrawing said spool into said recess upon axial movement of said knob and spindle to release a film roll from said camera.

8. A device as set forth in claim 7 wherein said various operative axial relative positions between said spindle and said bushing are defined by cooperative detent and groove means disposed within said bushing and upon said spindle.

References Cited in the file of this patent

UNITED STATES PATENTS

| | | |
|---|---|---|
| 2,171,660 | Leitz et al. | Sept. 5, 1939 |
| 2,229,606 | Hineline | Jan. 21, 1941 |
| 2,245,214 | Mihalyi | June 10, 1941 |
| 2,338,628 | Fairbanks | Jan. 4, 1944 |
| 2,571,661 | Bing et al. | Oct. 16, 1951 |
| 2,674,931 | Mihalyi | Apr. 13, 1954 |
| 2,704,969 | Mische | Mar. 29, 1955 |

FOREIGN PATENTS

| | | |
|---|---|---|
| 825,948 | Germany | Dec. 27, 1951 |